(12) United States Patent
Strothmann

(10) Patent No.: US 8,222,847 B2
(45) Date of Patent: Jul. 17, 2012

(54) DEVICE AND METHOD FOR DETERMINING THE ROTATIONAL POSITION OF A ROTOR IN AN ELECTRIC MACHINE

(76) Inventor: Rolf Strothmann, Saarbrücken (DE)

( * ) Notice: Subject to any disclaimer, the term of this patent is extended or adjusted under 35 U.S.C. 154(b) by 609 days.

(21) Appl. No.: 12/086,524

(22) PCT Filed: Dec. 9, 2006

(86) PCT No.: PCT/EP2006/011879
§ 371 (c)(1),
(2), (4) Date: Aug. 15, 2008

(87) PCT Pub. No.: WO2007/073853
PCT Pub. Date: Jul. 5, 2007

(65) Prior Publication Data
US 2009/0278485 A1    Nov. 12, 2009

(30) Foreign Application Priority Data

Dec. 15, 2005 (DE) .................. 10 2005 059 858
Sep. 29, 2006 (DE) .................. 10 2006 046 638

(51) Int. Cl.
*H02P 6/18* (2006.01)
(52) U.S. Cl. .............. 318/400.34; 318/400.36
(58) Field of Classification Search .......... 318/400.32, 318/400.33, 400.34, 400.36, 700, 720–724
See application file for complete search history.

(56) References Cited

U.S. PATENT DOCUMENTS

| | | | |
|---|---|---|---|
| 5,159,246 A | 10/1992 | Ueki | |
| 5,182,499 A * | 1/1993 | Inaji et al. | 318/400.17 |
| 5,254,914 A * | 10/1993 | Dunfield et al. | 318/400.34 |
| 5,367,234 A * | 11/1994 | DiTucci | 318/400.35 |
| 5,627,441 A * | 5/1997 | Sakurai et al. | 318/599 |
| 5,838,128 A * | 11/1998 | Maiocchi et al. | 318/400.35 |
| 5,869,944 A * | 2/1999 | Tanina | 318/599 |
| 5,982,571 A * | 11/1999 | Calfee et al. | 360/70 |
| 6,366,037 B1 | 4/2002 | Strothmann | |
| 6,555,988 B2 * | 4/2003 | Masaki et al. | 318/721 |
| 6,771,039 B2 * | 8/2004 | Sakurai et al. | 318/722 |
| 7,026,774 B2 * | 4/2006 | Inaba et al. | 318/400.33 |
| 7,122,985 B2 * | 10/2006 | Kikuchi | 318/400.34 |

FOREIGN PATENT DOCUMENTS

| | | |
|---|---|---|
| CA | 2301216 | 2/1999 |
| EP | 1 005 716 | 6/2000 |
| EP | 1 160 966 | 12/2001 |
| JP | 2001516196 | 9/2001 |
| WO | 2004/032316 | 4/2004 |
| WO | 2005/046043 | 5/2005 |

\* cited by examiner

*Primary Examiner* — Bentsu Ro
(74) *Attorney, Agent, or Firm* — Lucas & Mercanti, LLP; Klaus P. Stoffel

(57) ABSTRACT

The invention relates to a device and a method for determining the rotational position of the rotor of an electric machine that has star-connected pole winding phases. The device is equipped with a unit for applying voltage pulses (14-16) to at least one of the phases (1-3) and a unit that evaluates the neutral point potentials generated by the voltage pulses (14-16). The invention is characterized by the provision of the aforementioned unit for applying time-delayed voltage pulses (14-16) to different phases (1-3) and the unit for producing at least one differential between the neutral point potentials generated by said voltage pulses.

11 Claims, 3 Drawing Sheets

DEVICE AND METHOD FOR DETERMINING THE ROTATIONAL POSITION OF A ROTOR IN AN ELECTRIC MACHINE

The invention concerns a device for determining the rotational position of the rotor of an electric machine with a pole winding circuit with phase strands that are star-connected in accordance with the introductory clause of claim 1 and a method for determining the rotational position of the rotor in accordance with the introductory clause of claim 5.

A device and a method of this type is disclosed by EP 1 005 716 B1. The possibility of determining the rotational position of the rotor during motor operation by applying pulses to phase strands of electric machines, especially multipole electric machines, is based on the fact that the inductance of the phase strands within a half magnetic period is a well-defined function of the angle of rotation $\phi$ of the rotor, as described in the document cited above, EP 1 005 716 B1, which is herewith incorporated in the present application by reference. Therefore, test voltage pulses can generate a potential signal at the star point. This potential signal depends on the given induction of the phase strand and can thus serve as a measure of the position of the rotor within the half magnetic period.

The objective of the invention is to create a new device and a new method that allow simple and exact determination of the rotational position of the rotor.

This objective is achieved by the features specified in claims 1 and 5.

In accordance with the invention, time-offset test voltage pulses are applied to different phase strands, and at least one difference is formed between the star point potentials generated by the voltage pulses.

Like the potentials themselves, the difference also depends on the inductance of the phase strands, which varies with the angle of rotation $\phi$, and thus on the position of the rotor within a half magnetic period. Accordingly, said difference can be used as a measure of the rotational position of the rotor. It is advantageous that the formation of the difference eliminates background signal fluctuations, which act to the same extent on the different phase strands.

Preferably, test voltage signals are applied to phase strands, each offset from the other voltage pulses, the largest possible number of differently valued differences between the star point potentials is formed, the sign of the differences is determined, and the differences are compared with one another. Within a half magnetic period, the differences, like the star point potentials themselves, form a periodic, approximately sinusoidal function of the angle of rotation $\phi$. In the case of three phases, these functions are 120° out of phase with one another. Within a half magnetic period, twelve intervals (i) are formed, which can be distinguished by the fact that the differences have different signs and different magnitudes. Solely by determining the signs and comparing the differences among themselves, it is then possible to determine the rotational angle interval (i) in which the rotor is presently located. A more exact determination of the rotational position of the rotor within the intervals (i) can then be performed on the basis of arcsin or arctan functions.

A preferred embodiment of the invention involves electric machines operated with pulse-duration modulation, and the test voltage pulses can be operating voltage pulses used with time offset or test voltage pulses separated by the operating voltage pulses.

Preferably, all voltage pulses used in the determination of the rotational position are generated within a single modulation period. However, it is also possible to apply the test voltage pulses distributed over several modulation periods.

The invention is explained in greater detail below with reference to the specific embodiments illustrated in the accompanying drawings.

FIG. 1 shows phase strands 1 to 3 of the pole winding circuit of a 3-phase electric machine, which is otherwise not shown. In the specific embodiment in question here, the machine has a large number of magnetic periods, to which there corresponds a rotational angle $\Delta\phi$, which is much smaller than 360° and is, for example, 12°.

Figure 1:
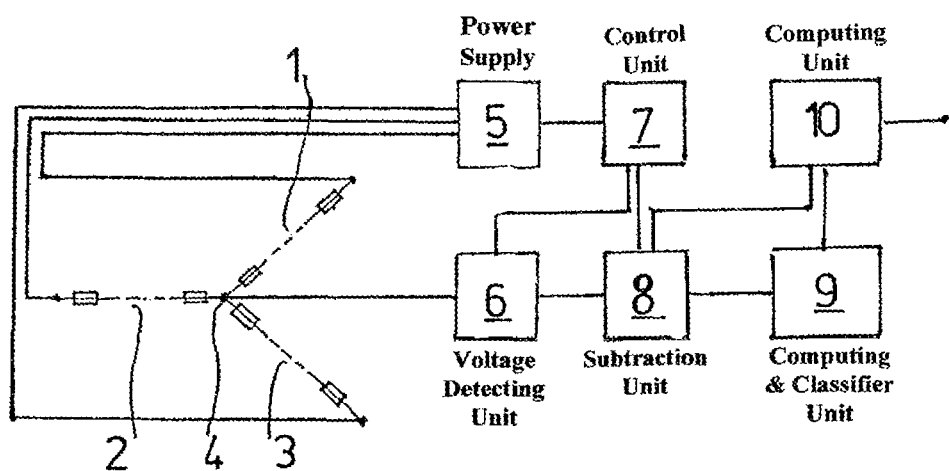
FIG. 1 is a schematic drawing of an electric machine with a device for determining the rotational position of the rotor in accordance with the invention.

The phase strands 1 to 3, which are connected with one another at a star point 4, are connected at their ends opposite the star point with a power supply circuit 5, by which the electric machine is operated by the pulse-duration modulation method.

The star point 4 is connected with a unit 6 for detecting the potential or voltage U at the star point. The unit 6 in turn is connected with a control unit 7, which also controls the power supply of the electric machine by the circuit 5.

The unit 6, which is used to detect the star point potential, is connected on the output side with a unit 8, which, under the control of the control unit 7, takes the differences M between voltage values U that are supplied as output values by the voltage detection unit 6.

Voltage difference values determined by the subtraction unit 8 can be supplied to a comparator and classifier unit 9, which uses the voltage difference values M to determine a rotational angle interval (i) within a half magnetic period $\Delta\phi/2$ that is indicative of the rotational position of the rotor of the electric machine.

A computing unit 10, which is connected with units 8 and 9, then determines the exact rotational position of the rotor within the half magnetic period.

It goes without saying that the units 7 to 10 are effectively implemented by computer software. Nevertheless, especially for units 6 and 8, a very simple circuit with hard wiring, which is explained later in connection with FIG. 4, can also be used.

Figure 2:
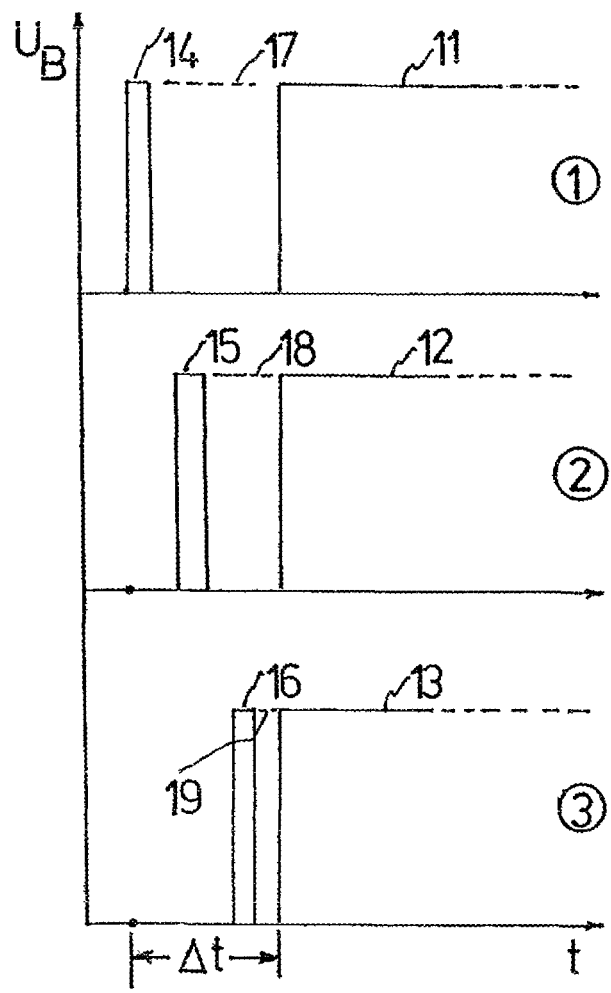
FIG. 2 is a drawing that illustrates the application of test voltage pulses to the phase strands of the electric machine.

As shown in FIG. 2, in accordance with pulse-duration modulation, operating voltage pulses 11 to 13 of a battery voltage UB are applied with time delay $\Delta t$ to the respective phase strands 1 to 3 in each modulation cycle (or in selected modulation cycles). Test voltage pulses 14 to 16 applied during the time interval $\Delta t$ by the circuit 5 and separated from the operating voltage pulses 11 to 13 are time-offset from one another.

The test voltage pulses 14 to 16 generate correspondingly time-offset voltage signals U1, U2, and U3 at the star point 4, and these voltage signals are detected by unit 6, which is activated simultaneously with the generation of the test voltage pulses 14 to 16 by the control unit 7.

In accordance with the dependence of the inductance of the phase strands 1 to 3 on the rotational angle $\phi$ within a half magnetic period Δϕ/2, a periodic, approximately sinusoidal curve is obtained for each voltage signal U1, U2, and U3 as a function of the rotational angle ϕ within a half magnetic period, with the three voltage signals being 120° out of phase from one another.

The unit 8 takes the differences M1=U1−U2, M2=U2−U3, and M3=U3−U1 from the voltage signals U1, U2, and U3. Three other possible differences differ from these differences only in sign.

Figure 3:
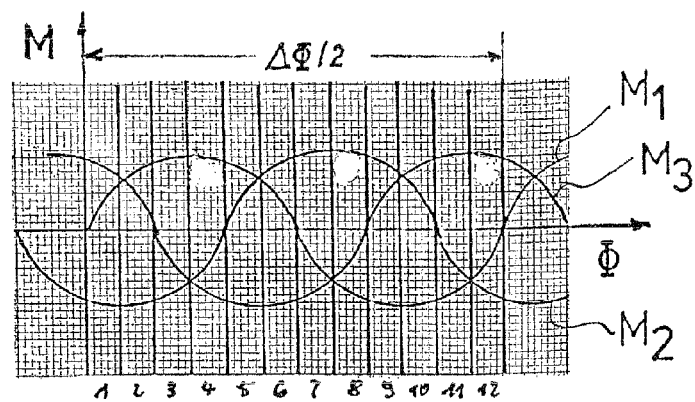
FIG. 3 is a drawing that illustrates the determination of the rotational position of the rotor.

FIG. 3 shows these differences as a function of the angle of rotation ϕ.

The approximately sinusoidal periodic curves M1(ϕ), M2(ϕ), and M3(ϕ) shown in FIG. 3 are also 120° out of phase with one another. A full period of each of these curves corresponds to a half magnetic period.

As is also evident from FIG. 3, within a full period of the curve M1, twelve intervals i=1 to 12 are obtained, for which the following apply:

i=1: M1 positive, M2 negative, M3 positive, M1 less than M3 i=2: M1 positive, M2 negative, M3 positive, M1 greater than M3 i=3: M1 positive, M2 negative, M3 negative, M2 less than M3 i=4: M1 positive, M2 negative, M3 negative, M2 greater than M3 i=5: M1 positive, M2 positive, M3 negative, M1 greater than M2 i=6: M1 positive, M2 positive, M3 negative, M1 less than M2 i=7: M1 negative, M2 positive, M3 negative, M1 greater than M3 i=8: M1 negative, M2 positive, M3 negative, M1 less than M3 i=9: M1 negative, M2 positive, M3 positive, M1 greater than M3 i=10: M1 negative, M2 positive, M3 positive, M1 less than M3 i=11: M1 negative, M2 negative, M3 positive, M1 less than M2 i=12: M1 negative, M2 negative, M3 positive, M1 greater than M2.

By determining the sign of three determined differences M1, M2, and M3 and by comparing these values with one another, the comparator and classifier unit 9 can determine the rotational angle interval (i) in which the rotor is presently located.

The exact calculation of the rotational position within the intervals (i) by the unit 10 is performed on the basis of arcsin or arctan functions, which are preferably applied to differences of the potential curves. The phase change and thus the advancing of the intervals can be determined by observation of switching states that also occur in normal working current application or can be produced by slight modification (time-offset switching on and off).

Figure 4:
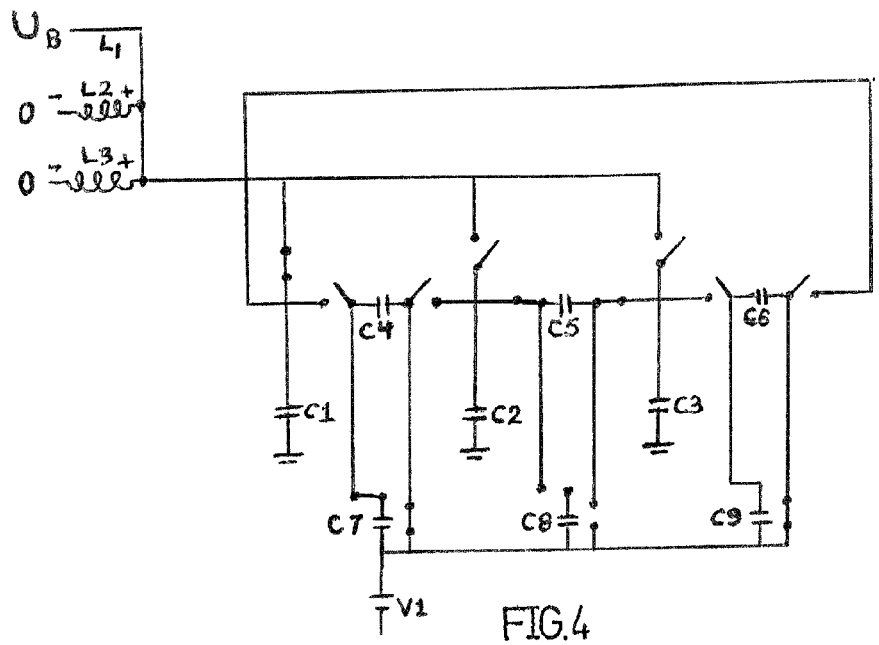
FIG. 4 shows a circuit that can be used to detect the star point potentials and to form differences between the detected star point potentials.

Units 6 and 8 can have the circuit shown in FIG. 4, which uses capacitors C1 to C9 for detecting the potentials at the star point in order to form the differences. The voltages U1, U2, and U3 lie above the capacitors C1, C2, and C3. The differences are formed by the capacitors C4, C5, and C6, so that the difference signals M1, M2, and M3 lie above the capacitors C7, C8, and C9.

To determine the total angle of rotation ϕ, a counter can be provided, which adds or subtracts the cycling half magnetic periods according to the direction of rotation.

To determine the initial rotational position, it is necessary to distinguish whether the half magnetic period in which the rotor lies is related to a north pole or a south pole. This can be accomplished by suitable application of current to the electric machine (without production of torque) to determine whether an increase in current leads to an increase or a reduction of the phase strand inductance.

In a departure from the embodiment shown in FIG. 2, instead of time-offset switching of separate pulses, the operating voltage pulses 11 to 13 could also be inserted at different times, as indicated by the broken lines 17 to 19.

Figure 5:
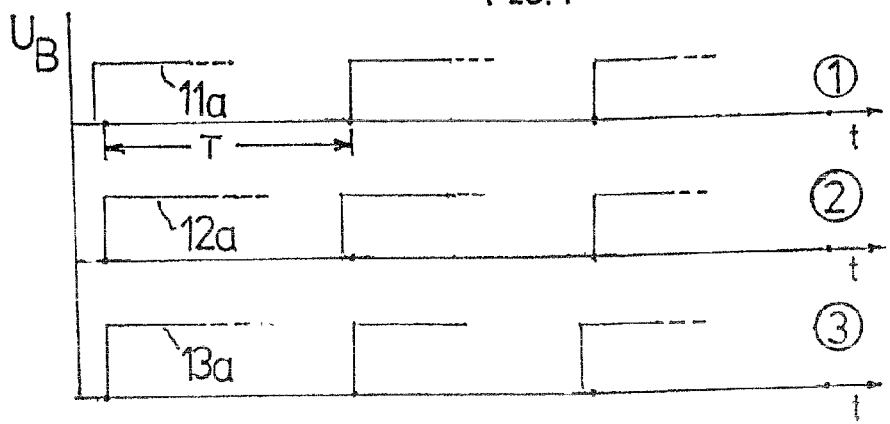
FIG. 5 is another drawing that illustrates the application of test voltage pulses to the phase strands.

FIG. 5 shows the possibility of allowing the premature insertion of the operating voltage pulse 11a, 12a, or 13a for the respective phase strand 1, 2, or 3 in three successive modulation periods T.

All together, even six switching states that can be used for determination of the rotational position can be produced in this way by switching on the pulse in question not only prematurely but also with time delay.

All together, six switching states can also be produced by separate test voltage pulses applied during time Δt (FIG. 2) by suitable temporal overlapping of the pulses.

Figure 6:
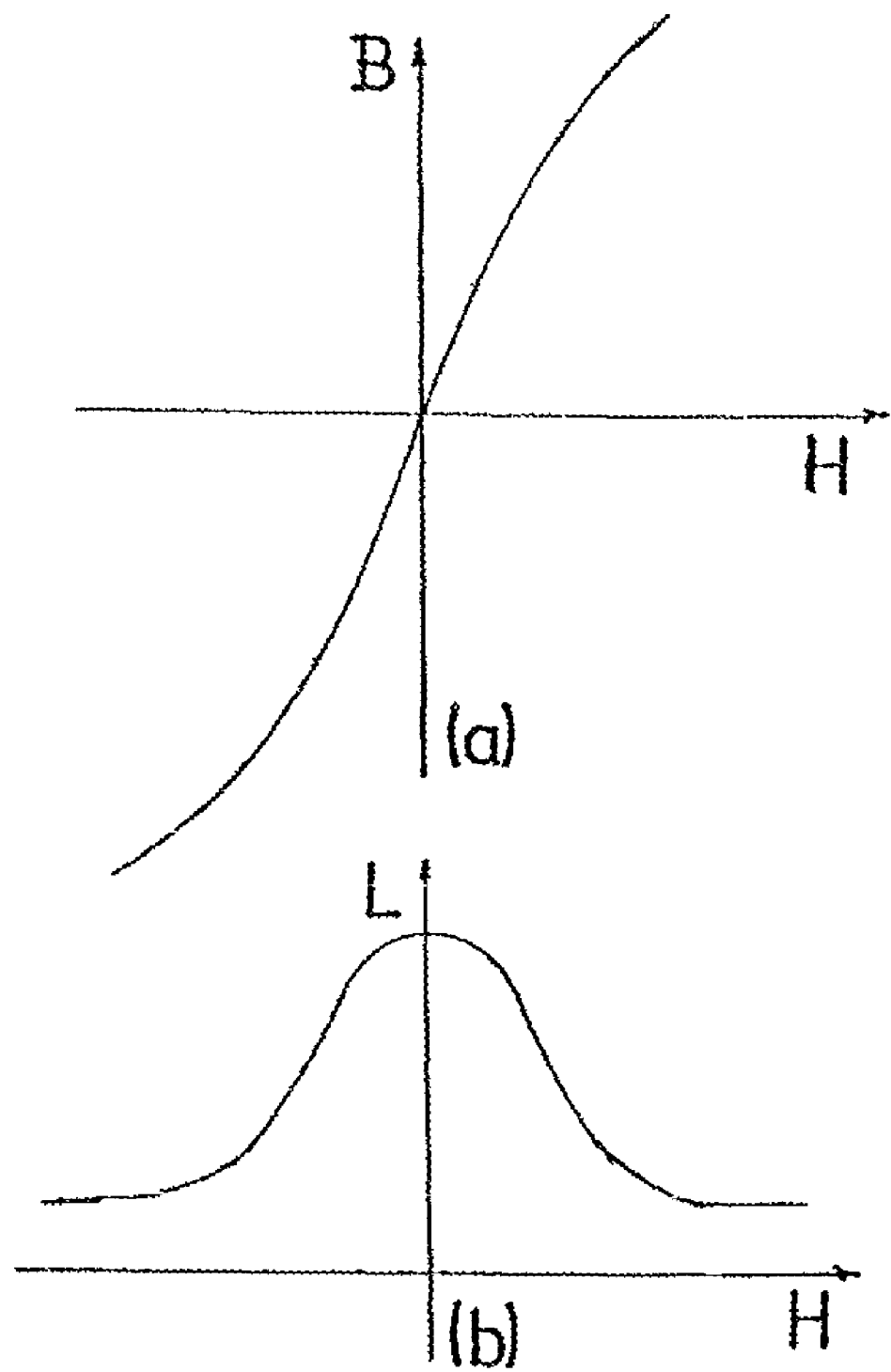
FIG. 6 shows the relationship between the magnetic field H of the electric machine passing through the pole windings and the induction B in the pole windings (a) and the inductivity L of the pole windings (b).

The aforementioned change in the inductance of the pole windings of the phase strands 1 to 3 is based on the relationship shown in FIG. 6a between the magnetic field H of the rotor passing through the pole windings of the phase strands and the induction field B produced in the iron-containing pole windings. The induction field B in the pole windings of the phase strands that is generated by the magnetic field H of the permanent magnets of the rotor varies according to the rotational position of the rotor within the half magnetic period. The slope dB/dH, which is proportional to the inductance of the phase strands, also varies with the variation of the induction field B. FIG. 6b shows the inductance L as a function of the magnetic field H.

The pulse voltage $U_B$ applied to any of the phase strands 1 to 3 is divided at the star point. Depending on the rotational position of the rotor, different division ratios and thus different potentials are obtained at the stationary point. The inductive reactance of the given phase strand to which the voltage $U_B$ is being applied and the inductive reactance of the parallel circuit of the other two phase strands are critical for the division ratio. However, due to the symmetry of the curve L(H) with respect to the L-axis, it cannot be distinguished whether the half magnetic period within which the rotational position of the rotor was determined is formed by a north pole or a south pole.

To determine whether the half magnetic period is related to a north pole or a south pole, in the embodiment described here, starting from the knowledge of the rotational position within the half magnetic field, current is applied to the electric machine by pulse-duration modulation in such a way that the field vector $\vec{H}$ or $\vec{B}$ resulting from the phase strand currents and generated by the totality of the pole windings consists of a first component that is directed exactly towards the middle between two poles of the rotor field and a second component that is directed exactly towards one pole of the rotor field. With respect to the magnetic period of the rotor field, the two components thus form a phase angle of 90°. Accordingly, only the first component produces a torque. The second component, which represents a reactive current, makes no contribution to the torque of the electric machines.

However, the additional reactive current provides a change in the magnetic field H and thus in the induction field B in the pole windings of the phase strands. If it is assumed that the pole windings of a selected phase strand of the rotor are in front of a north pole, then the second current component can be generated, e.g., in such a way that the magnetic field H passing through the pole windings is attenuated and the inductance L of these pole windings shows a corresponding increase, if this assumption is true. The "working point" then moves to the left in the positive part of the curve L(H) in FIG. 6b. If the assumption was false, and the pole windings are actually in front of a south pole, this leads to an increase in the magnitude of the field passing through the pole windings. The "working point" then moves to the left in the negative part of the curve L(H).

As a result of the decrease or increase in the inductance, the vector resulting from the signals M1 to M3 and having an angle of rotation φ increases or decreases in length. A north pole or south pole can be inferred from the change in length.

The observation of a variable-length vector could also be performed in connection with the normal operating current application by pulse-duration modulation without separate test voltage pulses 14 to 16.

The invention claimed is:

1. A device for determining the rotational position of the rotor of an electric machine with a pole winding circuit with phase strands (1-3) that are star-connected, with a first unit (5, 7) for applying voltage pulses (14-16; 11a-13a) to at least one of the phase strands (1-3), and with a second unit (6, 8) which evaluates the star point potentials (U1, U2, U3) generated by the voltage pulses in order to determine the rotational position of the rotor, wherein the first unit (5, 7) is provided for applying the voltage pulses (14-16; 11a-13a) during motor operation of the electric machine by pulse-wide modulation within at least one modulation period in succession to different pole winding phase strands (1-3), wherein the voltage pulses (14-16; 11a-13a) deal with particular pulses (14-16) in addition to the operation voltage pulses (11-13) or the operation voltage pulses (11a-13a) themselves, and the second unit (6, 8) is provided for determining the rotational position based on at least one difference (M1, M2, M3) between the star point potentials (U1, U2, U3) simultaneously generated with the voltage pulses (14-16; 11a-13a).

2. A device in accordance with claim 1, wherein the first unit (5, 7) is provided for applying to all of the phase strands (1-3) a pulse (14-16) that is time-offset from the other pulses, and the second unit (6, 8) is provided for forming the largest possible number of differences with different magnitudes, for determining the sign of the differences, and for comparing the differences with one another, in order to determine a rotational angle interval (i) in which the rotor is located.

3. A device in accordance with claim 1, wherein the voltage pulses are operating voltage pulses (11a-13a) or pulses separate from the operating voltage pulses (14-16).

4. in accordance with claim 3, wherein the first unit (5, 7) is provided for generating voltage pulses (14-16; 11a-13a) in a single modulation cycle or distributed over several modulation cycles (T).

5. A device in accordance with claim 1, wherein an additional unit, which, to obtain additional information about the state of the electric machine, especially information related to the orientation of the pole windings of a selected phase strand to a north pole or a south pole, evaluates a test signal that is affected by change of the inductance of the phase strands of the pole winding circuit of the electric machine due to current flow.

6. A device in accordance with claim 5, wherein the current that changes the inductance of the phase strands (1-3) of the pole winding circuit is a current flowing as part of the normal current application to the electric machine or is a separate current generated by the aforesaid additional unit.

7. A device in accordance with claim 6, wherein the unit for generating the current is designed in such a way that the current does not affect the torque of the electric machine.

8. A device in accordance with claim 7, wherein the current is a component of a resultant current vector, which, together with a component of this current vector that produces a torque, forms a phase angle of 90° with respect to the magnetic period.

9. A device in accordance with claim 5, wherein the test signal is affected by a change in the ratio of the inductances of the phase strands (1-3) of the pole winding circuit.

10. A device in accordance with claim 9, wherein the test signal is the potential at the star point of star-connected phase strands (1-3) of the pole winding circuit.

11. A method for determining the rotational position of the rotor of an electric machine that has a pole winding circuit with phase strands that are star-connected, where the rotational position of the rotor is determined by an evaluation of potentials that are generated at the star point by applying voltage pulses to at least one of the phase strands, wherein the rotational position of the rotor is determined by applying time-offset voltage pulses (14-16; 11a-13a) during operation of the electric machine by pulse-wide modulation within at least one modulation period in succession to different pole winding phase strands (1-3), wherein the voltage pulse (14-16; 11a-13a) deal with particular pulses (14-16) in addition to the operation voltage pulses (11-13) or the operation voltage pulses (11a-13a) themselves, and wherein the determination of the rotational position is based on at least one difference (M1, M2 M3) between the star point potentials (U1, U2, U3) simultaneously generated by the voltage pulses.

* * * * *